(12) United States Patent
Crosby

(10) Patent No.: US 9,578,807 B1
(45) Date of Patent: *Feb. 28, 2017

(54) BIOMASS HARVESTING SYSTEM

(71) Applicant: Lon Owen Crosby, Webster City, IA (US)

(72) Inventor: Lon Owen Crosby, Webster City, IA (US)

(*) Notice: Subject to any disclaimer, the term of this patent is extended or adjusted under 35 U.S.C. 154(b) by 533 days.

This patent is subject to a terminal disclaimer.

(21) Appl. No.: 13/798,069

(22) Filed: Mar. 12, 2013

Related U.S. Application Data

(60) Division of application No. 13/018,410, filed on Jan. 31, 2011, now Pat. No. 8,393,137, which is a continuation-in-part of application No. 11/824,845, filed on Jul. 3, 2007, now Pat. No. 7,877,970.

(60) Provisional application No. 60/818,988, filed on Jul. 5, 2006.

(51) Int. Cl.
| | |
|---|---|
| *A01D 41/127* | (2006.01) |
| *A01D 75/00* | (2006.01) |
| *A01D 37/00* | (2006.01) |
| *A01D 39/00* | (2006.01) |
| *A01D 43/00* | (2006.01) |

(52) U.S. Cl.
CPC ............ *A01D 75/00* (2013.01); *A01D 37/00* (2013.01); *A01D 39/005* (2013.01); *A01D 41/127* (2013.01); *A01D 43/006* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,817,945 | A | * | 12/1957 | McClellan | 56/1 |
| 4,912,914 | A | * | 4/1990 | Wingard | 56/16.4 B |
| 5,103,623 | A | * | 4/1992 | Herrett | 56/14.7 |
| 5,682,683 | A | * | 11/1997 | Haimer | 34/425 |
| 5,752,374 | A | * | 5/1998 | Allworden et al. | 56/341 |
| 6,041,582 | A | * | 3/2000 | Tiede et al. | 56/10.2 A |
| 6,931,828 | B2 | * | 8/2005 | Kormann | 56/250 |
| 7,032,369 | B1 | * | 4/2006 | Eaton et al. | 56/233 |
| 7,287,365 | B2 | * | 10/2007 | Dubois | 56/341 |
| 7,401,547 | B2 | * | 7/2008 | Degen | 100/43 |
| 7,404,283 | B2 | * | 7/2008 | Viaud | 56/228 |

(Continued)

*Primary Examiner* — Alicia Torres
(74) *Attorney, Agent, or Firm* — Steven C Wichmann

(57) ABSTRACT

A biomass harvesting system for harvesting agricultural plant growth from agricultural fields comprises a power source for providing mechanical and electric power to the system, a biomass accumulator for producing discrete units of accumulated biomass, a windrower for feeding biomass to the accumulator, a biomass quality analyzer for sensing and transmitting a set of quality characteristics of the biomass, a soil chemical analyzer for sensing and transmitting in real time soil chemical characteristics of the agricultural field soil, an active tracking system for identifying individual ones of the discrete units of accumulated biomass, and a central processing unit including a memory module storing an executable instruction set therein. The central processing unit executes the instruction set and integrates the sensed biomass quality characteristics and the sensed optimal quantity of biomass residue to remain on the field to determine a biomass quality index of the discrete units of accumulated biomass.

11 Claims, 5 Drawing Sheets

(56) References Cited

U.S. PATENT DOCUMENTS

| | | | | |
|---|---|---|---|---|
| 7,877,970 B1* | 2/2011 | Crosby | ............... | A01D 37/00 56/10.2 R |
| 8,393,137 B1* | 3/2013 | Crosby | ............... | A01D 91/04 56/341 |
| 2005/0126144 A1* | 6/2005 | Koselka et al. | ........... | 56/10.2 R |
| 2008/0271428 A1* | 11/2008 | Rempe et al. | ................. | 56/341 |

* cited by examiner

BIOMASS HARVESTING SYSTEM

CROSS REFERENCE TO RELATED APPLICATIONS

This Non-Provisional Utility application is a division of U.S. Non-Provisional application Ser. No. 13/018,410 filed 31 Jan. 2011, issuing as U.S. Pat. No. 8,393,137 on 12 Mar. 2013 which is a continuation-in-part of U.S. Non-Provisional application Ser. No. 11/824,845, filed 3 Jul. 2007, issued as U.S. Pat. No. 7,877,970 on 1 Feb. 2011, which are included in their entirety herein and claim the benefit of U.S. Provisional patent application Ser. No. 60/818,988, filed on 5 Jul. 2006, which is also incorporated herein in its entirety.

BACKGROUND OF THE INVENTION

Field of the Invention

The present invention relates to agricultural harvesting systems in general and more particularly to a system for the selective collection of plant growth commonly known as biomass.

Discussion of the Related Art

In recent years our society and the world in general has become increasingly more and more energy dependent. The resulting rise in energy demands have coupled with rising costs for petroleum based fuels to kindle an increased interest in alternative fuels that once may have been considered too costly to produce. Of particular interest are fuel sources that are considered to be 'renewable.' One of these renewable and alternative energy sources is commonly referred to as biomass.

Biomass generally includes living and recently dead biological material which can be used as fuel or for industrial production. Most commonly, biomass refers to plant matter grown for use as biofuel, but it also includes plant or animal matter used for production of fibers, chemicals or heat. Biomass may also include biodegradable wastes that can be burned as fuel, but it but it excludes organic material which has been transformed by geological processes into substances known as fossil fuels such as coal or petroleum.

Typical sources of biomass include several plants such as miscanthus, switchgrass, hemp, corn, poplar, willow and sugarcane. The particular plant used is usually not very important to the end products, but it does affect the processing of the raw material. Production of biomass is a growing industry as interest in sustainable fuel sources is growing. While the term biomass is also useful to identify plants where some of the plant's internal structures may not always be considered living tissue, such as the wood of a tree, and even though this biomass was produced from plants that convert sunlight into plant material through photosynthesis, the use of the term 'biomass' herein is by definition limited to agricultural plant growth that is harvested on a regular and periodic basis as part of an agricultural enterprise.

A major source of this biomass results from agricultural activities wherein the plant growth is produced specifically as a biomass product or alternatively is the residue of grain based agricultural crops. Traditionally, agricultural crop residues have been left on the field and reworked into the field's topsoil layer with the intent to return those nutrients removed during the crop's growth cycle and stored in the residue. Studies have revealed that sufficient and even optimal tilth levels in the topsoil layer can be maintained by returning only a fraction of the agricultural crop residue from a particular growth cycle. Until recently, there has been no particular incentive to remove the excess residue from agricultural fields other than for other agricultural uses such as bedding materials or low grade feed for agricultural livestock. However, with the interest in biomass as a renewable energy source, biomass can also now be considered an additional income source from the agricultural growth cycle to supplement the income derived from the harvested grains.

The desire to also harvest biomass from agricultural fields is tempered by the necessary caution to refrain from removing an excess of biomass and thus gradually depleting the topsoil nutrient levels after successive years of harvests. The nutrient needs of the topsoil vary geographically and even vary within the boundaries of a particular field such that determining harvestable quantities is location specific problem and not governed by general parameters applicable across an entire field. Such determinations must be made by an intelligent system that analyzes the topsoil layer concurrent with the harvesting of the biomass.

Thus, what is desired is a biomass harvesting system that efficiently removes the maximum quantity of biomass from a field while leaving sufficient biomass to minimize wind and water erosion and maintain soil tilth.

SUMMARY OF THE INVENTION

The present invention is directed to a biomass harvesting system that satisfies the need for a system to efficiently harvest biomass of agricultural plant growth from an agricultural field while intelligently analyzing the topsoil characteristics to assist in determining the quantity of agricultural plant growth to harvest. The biomass harvesting system comprises in operative combination a power source for providing mechanical and electric power to the system, a biomass accumulator for producing discrete units of accumulated biomass and a windrower for feeding biomass to said biomass accumulator. The system also includes a biomass quality analyzer for determining a set of quality characteristics of the accumulated biomass, a dirt control system for controlling the quantity of dirt in the accumulated biomass, and a ground cover residue monitor for determining on optimal quantity of biomass residue to remain on the agricultural field. An active tracking system identifies individual ones of the discrete units of accumulated biomass.

Another aspect of the present invention is a method of harvesting agricultural plant growth biomass from agricultural fields including the steps of chopping the agricultural plant growth with a chopping unit of a windrower during repeated passes over the agricultural field and windrowing the chopped agricultural plant growth with a windrower for feeding into a biomass accumulator. The chopped and windrowed agricultural plant growth is then scanned with a spectrum analyzer to determine the quality characteristic of the biomass. The ground surface is further scanned with a ground cover residue monitor to determine the quantity of ground cover residue remaining on the agricultural field after windrowing. The chopping unit of the windrower is adjusted to regulate at least one quality characteristic of the biomass and to further regulate, as a function of the sensed ground cover residue quantity, a revised quantity of ground cover residue to remain on the agricultural field after windrowing. The windrowed agricultural plant growth is accumulated into a discrete biomass unit whereupon an identification file with an active tracking system is created for individual ones of the discrete units of accumulated biomass, the identification file at least including quality characteristics of the discrete accumulated biomass unit. The identification file is then associated with the discrete accumulated biomass unit.

Yet another aspect of the invention is a biomass harvesting system for harvesting agricultural plant growth from agricultural fields comprises a power source for providing mechanical and electric power to the system, a biomass accumulator for producing discrete units of accumulated biomass, a windrower for feeding biomass to the accumulator, a biomass quality analyzer for sensing and transmitting a set of quality characteristics of the biomass, a ground cover residue monitor for sensing and transmitting an optimal quantity of biomass residue to remain on the field, an active tracking system for identifying individual ones of the discrete units of accumulated biomass, and a central processing unit including a memory module storing an executable instruction set therein. The central processing unit executes the instruction set and integrates the sensed biomass quality characteristics and the sensed optimal quantity of biomass residue to remain on the field to determine a biomass quality index of the discrete units of accumulated biomass.

Still another aspect of the invention is a biomass harvesting system for harvesting agricultural plant growth from agricultural fields including a power source for providing mechanical and electric power to said system, a biomass accumulator for producing discrete units of accumulated biomass, a windrower for feeding biomass to said biomass accumulator, a biomass quality analyzer for sensing and transmitting a set of quality characteristics of the accumulated biomass, a soil chemical analyzer for sensing in real-time and transmitting soil chemical characteristics of the agricultural field soil, an active tracking system for associating a specific geographical location of the agricultural field with said biomass quality characteristics and said sensed soil chemical characteristics, and a central processing unit including a memory module storing an executable instruction set therein. The central processing unit executes the instruction set and integrates the sensed biomass quality characteristics and the sensed soil chemical characteristics of the agricultural field to determine in real-time and in accordance with the executed instruction set a quantity of biomass to remain on said agricultural field.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF THE PREFERRED EMBODIMENT

Figure 2:
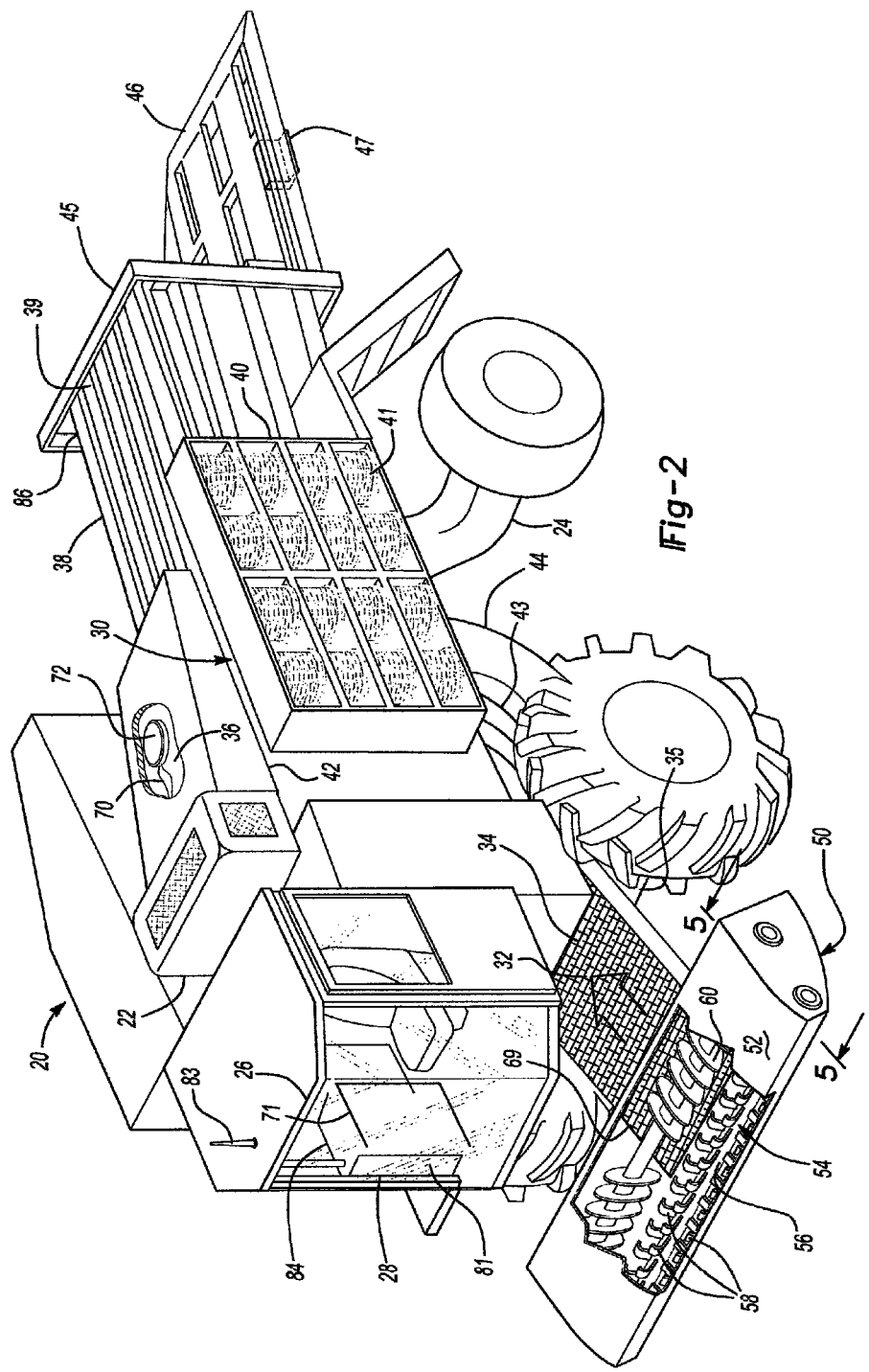
FIG. 2 is a perspective view of a biomass harvesting system embodying the present invention.
Figure 4:
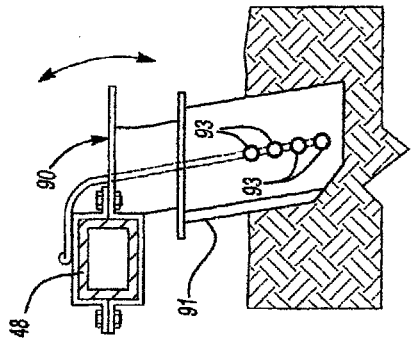
FIG. 4 is a side elevation view of the topsoil quality analyzer engaged in the topsoil layer shown in FIG. 3, taken along the line 4-4.

For purposes of description herein, the terms "upper", "lower", "left", "rear", "right", "front", "vertical", "horizontal", and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
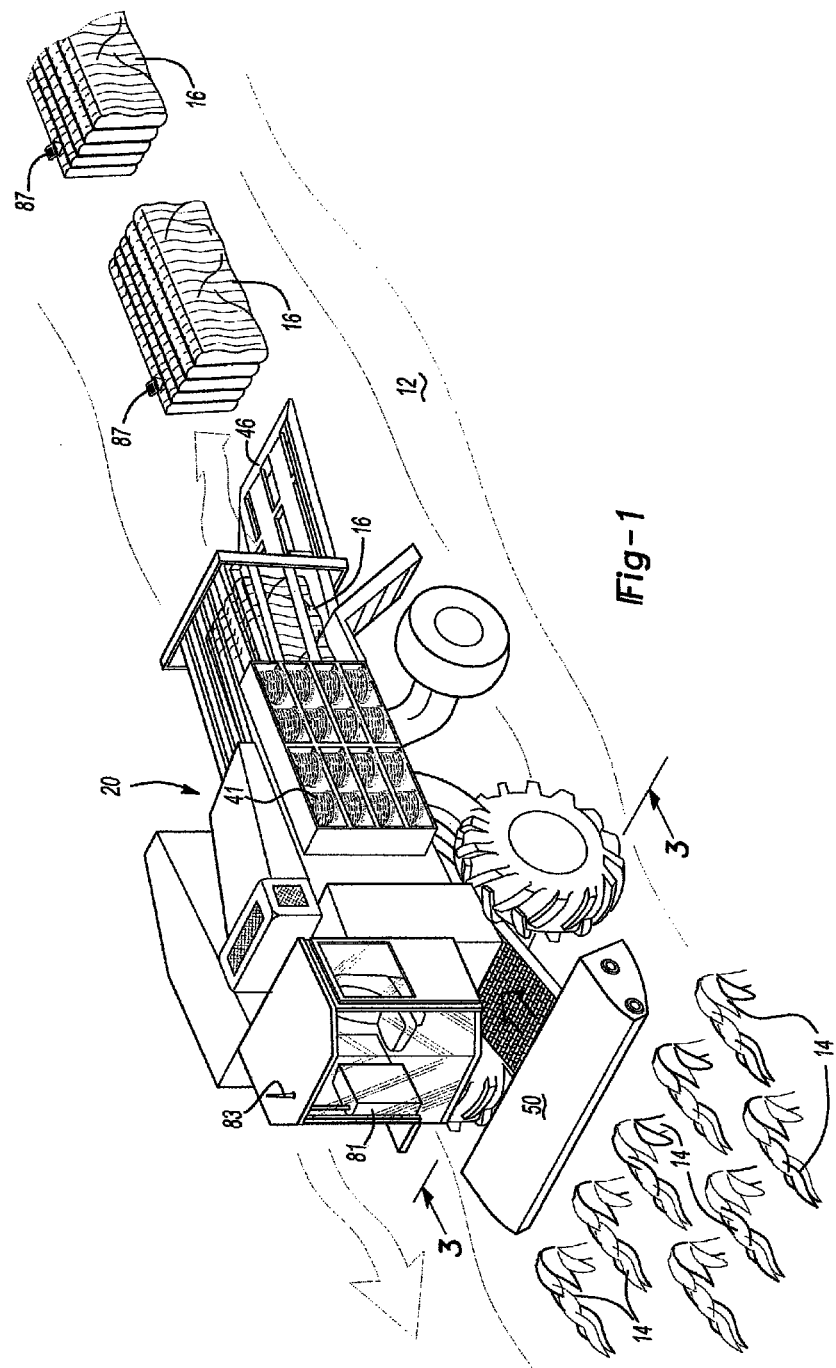
FIG. 1 is a perspective view of a self-propelled biomass harvesting system embodying the present invention, wherein the system is harvesting agricultural crop residue in an agricultural field.

Turning to the drawings, FIG. 1 shows a biomass harvesting system 20 which is one of the preferred embodiments of the present invention and illustrates its various components. Biomass harvesting system 20 is operating in an agricultural field 12 for harvesting in a single pass manner agricultural plant growth 14, here depicted as residual corn stalks remaining after the prior grain harvesting of the corn plants, for the purpose of creating discrete biomass units 16 such as individual bales of cornstalks. While the harvesting system 20 is shown as harvesting cornstalks 14, those practiced in the art will readily recognize that the concepts embodied herein are generally applicable to all biomass harvesting systems, and that agricultural plant growth 14 can comprise plant growth produced specifically as a biomass product or alternatively, as shown, is the residue of grain based agricultural crops after harvesting the grain.

Referring now to FIG. 2, biomass harvesting system 20 includes a power source such as an internal combustion engine 22 mounted on a chassis frame 24 for providing mechanical and electrical power to biomass harvesting system 20. As shown, biomass harvester 20 is a self propelled unit including an enclosed cab 26 in which an operator can sit to control the harvester 20 and monitor its various subsystems.

Also mounted on the chassis 24 is a biomass accumulator 30. Biomass accumulator 30 as shown is a baler that produces a series of discrete biomass units 16 (FIG. 1) or bales of harvested agricultural growth 14. Operation of a baler is well known in the industry and is briefly described herein for clarity. A collecting apron 32 receives a windrow of biomass for harvesting from a windrower 50 (discussed in further detail below). Collecting apron 32 delivers the windrow of harvested biomass to a pre-chopper 34 where the biomass is reduced to smaller pieces to facilitate a uniform density of the final bale of biomass. A predefined quantity of biomass is then captured by a sweep arm or conveyor 35 and delivered to a pre-compression chamber 36 where the predefined quantity of biomass is formed into an individual flake and inserted into compression chamber 38. A bale is comprised of a plurality of individual flakes compressed together in compression chamber 38. Compression chamber 38 includes adjustable sides 39 that are selectively adjustable to constrict or open the cross-sectional area of the compression chamber end 45. Adjusting sides 39 to increase constriction results in higher density bales while conversely, decreasing constriction results in lower density bales. Thus, the density of the biomass bales produced can be selectively controlled by the operator to meet specific demands. Once the series of accumulated flakes reaches a predefined volume, needles 43 travel through needle guards 44 to thread a series of twine strands through the series of accumulated flakes in compression chamber 38. In such manner, the twine strands fed from twine spools 41 in twine rack 40 completely surround the series of flakes whereupon knotting mechanism 42 securely ties ends of the twine strands in knots thereby securing the plurality of flakes together in a single bale 16. As bales 16 continue to exit from compression chamber end 45, bales 16 are temporarily supported on trailing platform 46 until completely exited from compression chamber 38 whereupon bales 16 are allowed to fall to the ground for later retrieval.

Biomass harvesting system 20 has a windrower 50 mounted at a front thereof. Windrower 50 can collect pre-cut or pre-chopped biomass from a wide swath or, as shown, comprises a housing 52 operatively retaining a chopping unit 54 for simultaneously chopping the agricultural plant growth 14 and delivering the chopped plant growth 14 to a transporter 60, here shown as an auger 62. Alternatively, transporter 60 can comprise a mesh belt (not shown). Transporter 60 accumulates the chopped plant growth from the entire swath width covered by windrower 50 and delivers the chopped plant growth to a central windrow exit 69 for discharge onto collecting apron 32. Chopping unit 54 typically comprises one or more rotating drums 56 to which are pivotally affixed a plurality of flail knives 58. Those practiced in the art will readily recognize that flail knives can conform to a plurality of design configurations known in the agricultural industry.

The biomass harvesting system 20 further includes additional subsystems for analyzing the quality of the biomass being harvested, and the condition of the agricultural field topsoil to optimize the quantity and quality of the biomass bales 16 produced thereby. Several determinations must be made by an intelligent system that analyzes the topsoil layer concurrent with the harvesting of the biomass. In such a manner, harvesting system 20 includes a central processing unit 28 that has a memory module with an executable instruction set stored therein. Central processing unit 28 executing the instruction set integrates the operation of biomass accumulator 30 and windrower 50 with subsystems such as biomass quality analyzer 70, dirt control system 63, ground cover residue monitor 76, active tracking system 81 and soil chemical analyzer 90 to maximize the biomass quality and quantity being harvested while providing agricultural field 12 with sufficient biomass residue for erosion control and nutrient replenishment.

Biomass quality analyzer 70 comprises a spectrometer 71 that receives electronic signals from a sensor head 78 positioned in proximity to the path of the biomass as the biomass transits through biomass accumulator 30. Spectrometer 71 samples via sensor head 72 the biomass throughput at predetermined time intervals. Spectrometer 71 chemically analyzes the spectral signature of the biomass entering the pre-compression chamber 36 of baler 30. This spectrometer data is analyzed to extract relevant chemical quality data of the biomass, determining such characteristics as moisture, dirt, cellulose, lignin, hemicellulose, fungal contamination and other characteristics. Individual sample signals are integrated across all of the biomass sampled and compressed into each discrete bale 16. The integrated quality data is transmitted to central processing unit 28 for further processing according to the executable instruction set.

Referring now to FIGS. 2, and 5-7, the dirt control system 63 utilizes the dirt levels sensed by biomass quality analyzer 70 to determine if the amount of dirt contained in the biomass is at an acceptable level, or if there is excessive dirt in the biomass. If the dirt level is determined to be excessive, the excess dirt and other unwanted particles must be sifted out of the biomass stream. The central processing unit 28 issues commands to perform tasks individually or in combination to adjust the speed of harvesting system 20 across agricultural field 12, to raise or lower the height of chopping unit 54 above the surface of agricultural field 12, and to adjust the rotational speed of chopping unit 54 to reduce the amount of dirt picked up by flail knives 58. Further, operational speed of transporter 60 is modifiable in response to commands from central processor 28.

Figure 5:
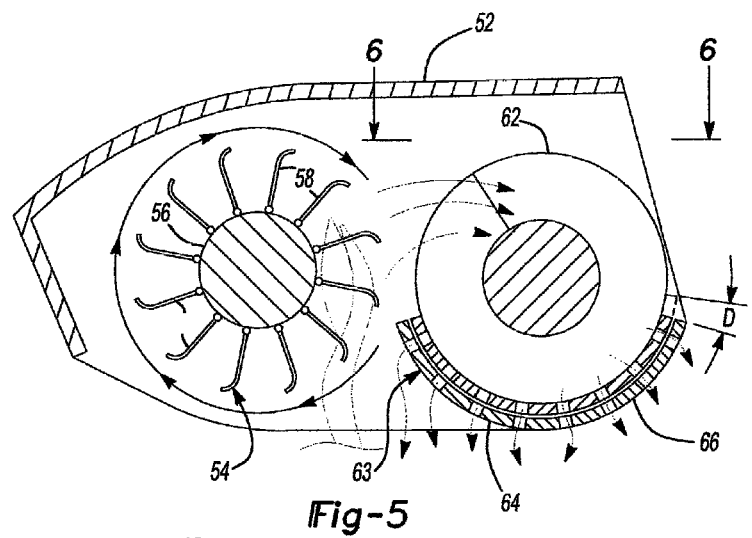
FIG. 5 is a side elevation cross-sectional view of a representative chopping head of the biomass harvesting system shown in FIG. 2 and taken along the line 5-5.
Figure 6:
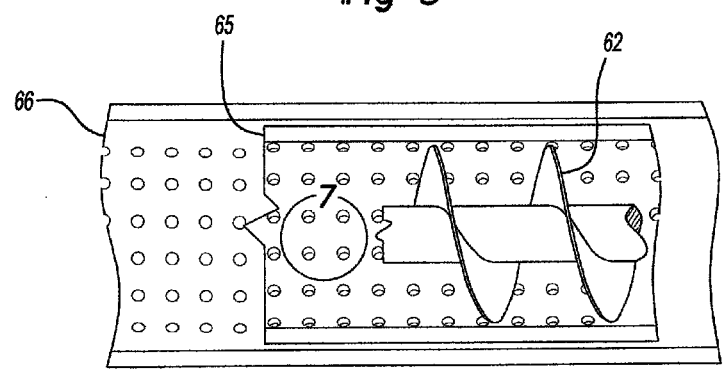
FIG. 6 is a top view of the auger portion of the chopping head shown in FIG. 5 and taken along the line 6-6.
Figure 7:
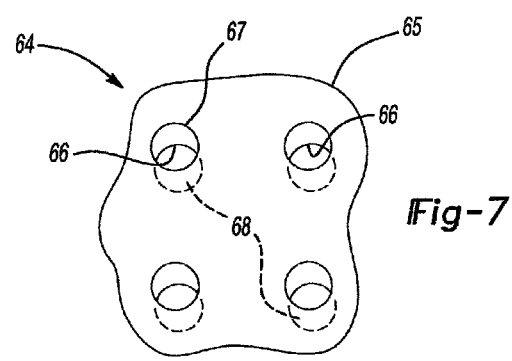
FIG. 7 is an enlarged plan view of the slotted housing for the auger shown in FIG. 6 and denoted by the numeral 7, FIG. 6.

Transporter 60, as shown, has at least one auger 62 in a slotted housing 64 for feeding the biomass to windrow exit 69. Slotted housing 64 includes first and second arcuate housing members 65, 66 wherein first arcuate housing member 65 is nested within second arcuate housing member 66. Each housing member 65, 66 defines a plurality of slots 67, 68 respectively or apertures in a lower portion thereof in a predefined and substantially identical pattern such that translation of first housing member 65 with respect to second housing member 66 will vary the final slot size for allowing dirt and particulate materials to be sifted out of the biomass being transported therealong. Such translation is represented in FIG. 5 by angular displacement 'D.'

When quality sensor 72 detects an excess of dirt or unwanted particulates in the biomass, the excess dirt signal is transmitted to central processing unit 28, and in response thereto central processing unit 28 commands slotted housing 64 to adjust the alignment of slots 67, 68 to enlarge the slot openings and thereby increase the sifting out of unwanted dirt and particulates. Alternatively, transport 60 can comprise a mesh belt of variable composition which allows dirt to fall through (not shown). Further dirt control system can be augmented by an air stream (not shown) with adjustable volume and pressure controls for directing air over and through the biomass to assist in dirt and fine particulate removal.

Figure 3:
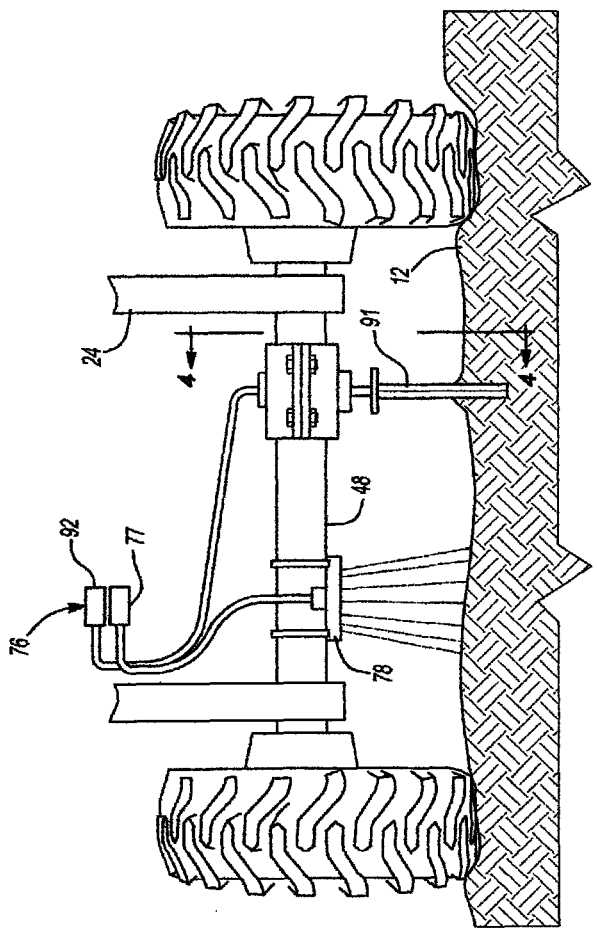
FIG. 3 is an cross-sectional view of the lower portion of the harvesting system shown in FIGS. 1 and 2, taken along the line 3-3, FIG. 1 and illustrating the positioning of topsoil analysis sensors.

As illustrated in FIGS. 2 and 3, harvesting system 20 also includes a ground cover residue monitor system 76 comprising an analyzer 77 and an associated sensor head 78 mounted on sensor bar 48 positioned behind windrower 50. Ground cover residue monitor system 76 can be either a spectroscopy based system or an imaging analysis base system. In use, sensor head 78 scans the surface of agricultural field 12 during operation of harvesting system 20 and transmits associated electrical signals to analyzer 77 for determination of the quantity of agricultural plant growth 14 remaining on the surface of agricultural field 12. The quantity data in turn is transmitted to central processing unit 28 which in response to the executed instruction set determines the desired quantity of agricultural plant growth 14 to remain on the surface of agricultural field 12 for proper nutrient retention and erosion control. If central processing unit 28 determines the amount of agricultural plant growth 14 to be left on field 12 requires modification, associated control signals are transmitted to windrower 50 to increase or decrease the size of the slots in slotted housing 64 and, in combination therewith or independently therefrom, to raise or lower chopping unit with respect to the surface of agricultural field 12.

A soil chemical analyzer 90 can also be integrated with biomass harvesting system 20. Soil chemical analyzer 90 typically comprises a spectrometer 92 and at least one sensor head 93 embedded within a soil penetration element 91. Soil penetration element 91 is mounted to sensor bar 48 and includes provisions for being selectively movable between a first position raised above the surface of agricultural field 12 and a second position wherein the soil penetration element 91 is engaged within the topsoil layer of agricultural field 12. Typically, soil penetration element 91 is a knife-edged blade that penetrates from one to six inches below ground surface. Sensor head 93 is embedded in a side of element 91 such that periodic samples of the topsoil chemical composition can be sensed as sensor head 93 passes the soil at a predetermined depth. A vertical chemical profile of the topsoil layer can be obtained by embedding a plurality of sensor heads 93 in a vertically spaced arrangement in soil penetration element 91. Each sensor head 93 is associated with a compatible spectrum analyzer 92 and samples the chemical composition at its predetermined depth. The resulting chemical composition data is transmitted to central processing unit 28 for compilation into a spatial map of the chemical composition of agricultural field 12. Further, the derived chemical composition data can be utilized by central processing unit 28 to aid in determining the quantity of agricultural plant growth 14 to remain on agricultural field 12 after harvesting of the biomass. Excess removal of agricultural plant growth costs the producer by requiring alternative costly means of replacing nutrients.

Harvesting system 20 would also ideally be tied into an active tracking system 81 that provides location specific geographic information such as a global positioning system. Global positioning system includes a GPS antenna 83 mounted on harvesting system 20 and interconnected with GPS receiver 84 which is also integrated with central processing unit 28. As an alternative, tracking devices can be affixed to individual bales 16 by utilizing a radio frequency identification (RFID) system 86 that attaches an RFID tag 87 to each biomass bale 16. In operation, and with utilization of a GPS system in operable association with central processing unit 28, an identification file for an individual bale 16 is created wherein the identification file includes geographical location and quality characteristics of the bale 16. In addition, trailing platform 46 can also include a weight sensor 47 that is typically strain gauge based for determining the weight of individual bales 16 for inclusion in the data file for each bale 16. The bale 16 location is later recalled when the bale is collected and is thus positionally tracked throughout its handling. Alternatively, when an RFID system 86 is incorporated in operable association with central processing unit 28, an identification file is created for an individual bale 16 of accumulated biomass. The identification file includes quality characteristics of individual bale 16 and the identification file is transferred to a radio frequency identification tag 87 for attachment to bale 16 upon creation thereof. In such manner and as long as tag 87 is attached to bale 16, the individual unique quality characteristics of each bale 16 are readily available by electronically reading the identification file stored thereon.

The location specific geographic information system is important because it allows biomass units to be aggregated, stored, transported and processed in a non-linear manner. For example, discrete biomass units such as bales 16 harvested with elevated moisture content and hence susceptible to uncontrolled decay can be aggregated and preferentially processed while ambient environmental conditions are cold enough to inhibit spoilage.

Figure 8:
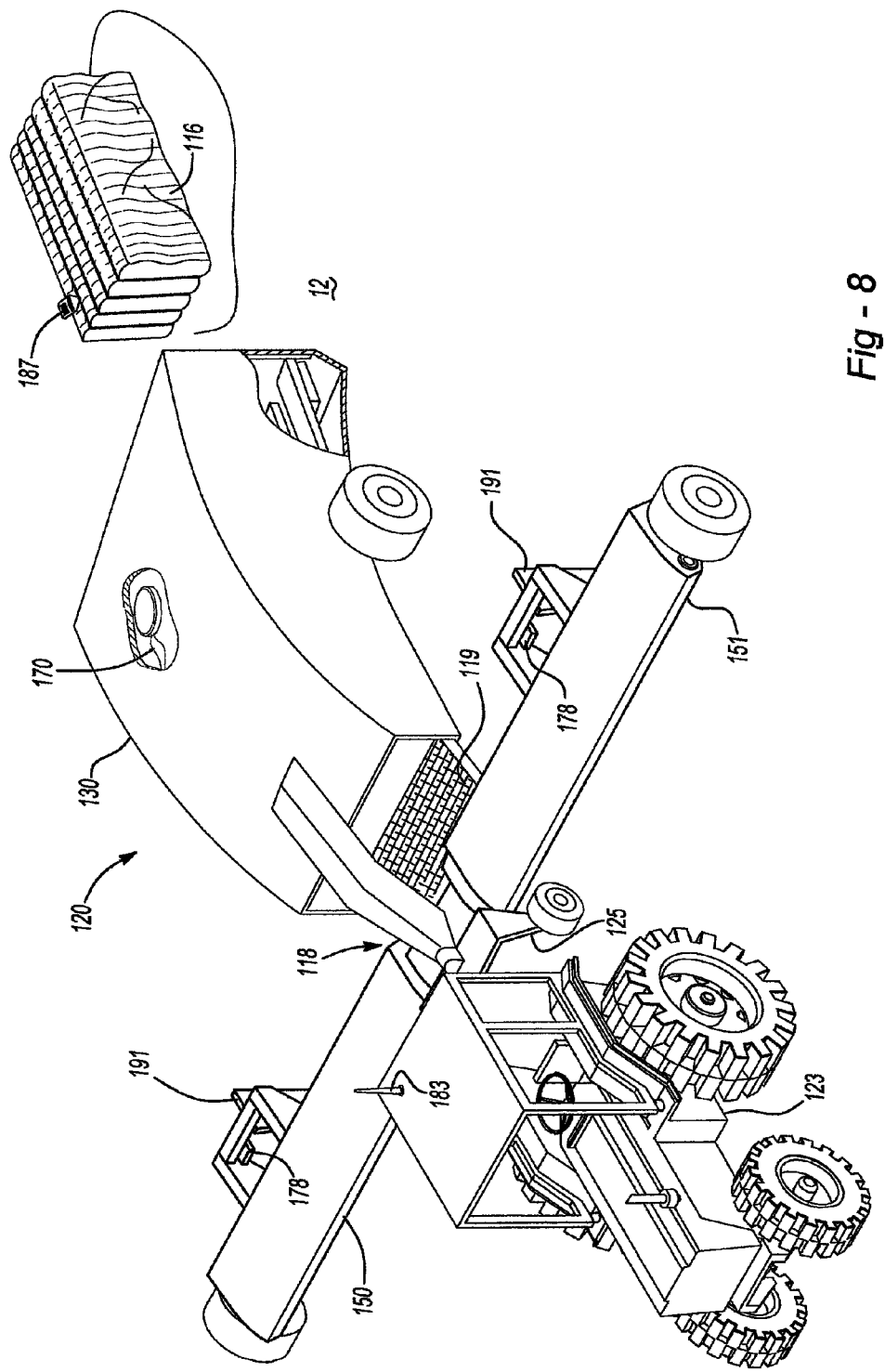
FIG. 8 is a perspective view of a modular biomass harvesting system pulled by an agricultural tractor and embodying the present invention, wherein the system is harvesting agricultural crop residue in an agricultural field.

FIG. 8 illustrates an alternate embodiment of a modular biomass harvesting system 120. Modular system 120 includes a tractor 123 for providing mechanical and electrical power to harvesting system 120. A toolbar 125 is attached to tractor 123 and in turn at least one windrower 150 and alternatively a second windrower 151 are attached to toolbar 125 for being drawn through an agricultural field 12. Windrowers 150, 151 operate in a similar manner with similar features as windrower 50 as described above. One or both windrowers 150, 151 have mounted to a rear portion thereof a ground cover residue monitor sensor head 178 and a soil chemical analyzer 190 that operate in similar manner as ground cover residue monitor sensor head 78 and soil chemical analyzer 90 for harvesting system 20 as described above. A biomass accumulator 130 is also attached to toolbar 125 and is positioned to trail behind windrowers 150 and 151 in such a manner to simultaneously gather the biomass streams 118 and 119 from windrowers 150 and 151 respectively. Biomass accumulator 130 is typically a baler that is of a standard and known design for producing bales 116. Baler 130 also has associated therewith a biomass quality analyzer 170 for sensing quality characteristics of the biomass transiting baler 130. System 120 also includes an active tracking system for attaching RFID tags 187 and for geographical positioning utilizing a GPS system as evidence by GPS antenna 183 on tractor 123. A central processing unit (not shown) integrates all sensor subsystems and can be located in tractor 123 or another convenient location on modular harvesting system 120.

In use, and referring again to biomass harvesting system 20, system 20 is utilized for harvesting agricultural plant growth 14 from agricultural fields 12. Initially, the agricultural plant growth 14 is chopped with a chopper unit 54 of a windrower 50 during repeated passes over the agricultural field and windrowing the chopped agricultural plant growth 14 with windrower 50 for feeding into biomass accumulator 30. The chopped and windrowed agricultural plant growth 14 is then scanned with a biomass quality analyzer 70 to determine the quality characteristic of the biomass. The ground surface is further scanned with a ground cover residue monitor 76 to determine the quantity of ground cover residue remaining on the agricultural field 12 after windrowing. The chopping unit 54 of the windrower 50 is adjusted to regulate at least one quality characteristic of the biomass such as the dirt content as sensed by biomass quality analyzer 70 and to further regulate, as a function of the sensed ground cover residue quantity, a revised quantity of ground cover residue to remain on the agricultural field 12 after windrowing. The windrowed agricultural plant growth 14 is accumulated into a discrete biomass unit such as a bale 16 whereupon an identification file with an active tracking system 81 is created for individual ones of the bales 16. The identification file includes quality characteristics of bale 16. The identification file is then associated with bale 16 by either attaching an RFID tag 87 or assigning a GPS geographic identifier with the bale 16 for later recovery. A soil chemical analyzer 90 can further be used to pass a soil penetration element 91 having sensors 93 embedded therein through the topsoil layer of the agricultural field 12 to determine the vertical chemical profile of the topsoil and further utilizing this chemical data to partially determine the proper adjustment of the windrower 50.

The collection, analysis and integration of biomass composition, soil surface residue and soil chemical analysis in real-time is important as is the use of real-time quality information in biomass harvesting and marketing. As utilized in the descriptions herein, real-time data refers to quality characteristics of the collected biomass at the time it is collected and with reference to the specific location on the agricultural field from which it is collected in order to assign a quality rating or quality index to a discrete biomass unit 16. Further, reference to real-time soil chemical analysis refers to the sensed chemical analysis at the specific geographical location of the field within set area parameters defined by the instruction set executed by central processing unit 28. The user can predefine within the instruction set executed by central processing unit 28 the particular soil chemical characteristics desired to be maintained in the agricultural field 12 from which the biomass 14 is being harvested. The user can also predefine within the instruction set executed by central processing unit 28 the ranges of specific parameters relating to quality levels of the harvested biomass 14 to quantifiably give each biomass unit 16 a quality rating or quality index. The quality ratings can also conform to uniform standards predetermined by a government agency such as the U.S. Department of Agriculture (USDA).

Residual soil surface residue levels define maximum allowable biomass harvest rates since surface residue levels directly affect the potential for wind erosion and water erosion. There is significant spatial variability in above surface biomass residue which requires real-time analysis. In general, biomass residue levels are related to grain yield which also exhibits significant spatial variability. To maximize biomass harvest while meeting surface residue needs, the percentage of biomass harvested has to be continually adjusted in real-time. Indeed, USDA (the regulatory agency for this parameter) is not interested in average levels across a field but insuring that minimum levels are met at all locations within the field.

Acceptable harvest rates of biomass 14 may be influenced by near-surface root mat density which may be determined in real-time by soil chemical analysis utilizing soil chemical analyzer 90. A good example of this effect may be the harvest of biomass from a plant species (grass) whose roots form a "sod" layer at the soil surface.

Acceptable harvest rates of biomass 14 may also be influenced by soil chemical composition which may exhibit extreme spatial variation across a field. A portion of the surface biomass residue resulting from the production of an agricultural crop may be (depending upon tillage practices, the local environment, soil insect/worms, etc.) incorporated into the soil profile through natural and/or agricultural practices. If organic matter in the soil is below a desired level, it may be desirable to leave additional biomass residue on the soil surface. Similarly, if the surface biomass residue is high in a specific nutrient which the soil is deficient in, it may be desirable to increase the unharvested fraction of surface biomass residue.

The kind and quantity of organic matter in the soil is important. Typical fractions may be lignin, cellulose and hemi-cellulose. These components are the building blocks of any plant's cell walls. However, soil is actually a complex ecological environment with hundreds of thousands of different species of microbes (aerobic, anaerobic and facultative) archaea, insects, mites, etc. These represent the living organic matrix of the soil. In addition, soil includes other discreet components such as humus and biochar. The levels of all of the above can be used to define a minimum and optimum level of unharvested biomass 14 to remain on the surface of the agricultural field 12.

At the same time, there can easily be too much surface residue left on a field. Farmers have fought this issue for millennia through surface tillage and/or the routine burning of surface biomass residues. High soil surface residue levels result in reduced soil drying which is frequently required for the conduct of routine agricultural production activities such as: High soil moisture levels and low soil oxygen levels which may promote the development of crop diseases, insect infestations; Cool soil temperatures which inhibit seed germination, etc. Surface tillage can be undesirable because tillage operations generally destroy soil texture/tilth, promote the oxidation of organic matter through the introduction of excess oxygen, etc. Hence, the goal is to remove the optimum amount of surface residue 14 to further optimize the chemical composition and environmental characteristics of agricultural field 12.

The chemical composition of the soil in agricultural field 12 is important because all plants require nutrients for growth, and inadequate supplies of essential nutrients result in reduced plant productivity (grain, biomass, etc.). However, providing excess water soluble nutrients can result in those nutrients entering the water supply and creating an environmental problem (such as hypoxia in the Chesapeake Bay, Gulf of Mexico, etc.). If a specific soil nutrient level is high or excessive, and the crop residue is also high in that nutrient, it may be desirable to increase the removal rate of biomass 14.

At the same time, different soil fractions may have the ability to reversibly bind specific soil nutrients keeping them out of the water supply while allowing plants to access that nutrient for growth. Examples might include biochar, humus, etc. Therefore, this data is important in defining minimum, maximum, or optimum removal rates of biomass 14 from agricultural field 12.

Knowledge of the chemical composition of the biomass 14 being harvested is also important. When many agricultural crops dry down at maturity, the moisture level in various parts of the plant may vary dramatically. For example, in maize, the grain may have 15 percent moisture early in the harvest season but the stalk may have 60% moisture. Later in the harvesting season, both fractions may be 15%.

Biomass 14 such as maize fodder baled at 60% moisture is fundamentally different than fodder baled at 15%. At 60% moisture, uncontrolled microbiological decay starts almost immediately unless controlled by cold storage conditions, by the addition of chemical preservatives, by the addition of biological preservatives, or by immediate secondary drying processes. Handling fodder with 60% moisture may also require different equipment, approaches, etc.

If the process for utilizing harvested biomass 14 requires particle reduction (i.e., grinding, etc.), knowledge of the moisture levels is critical to the physical process of particle size reduction. A requirement to reduce the particle size of biomass 14 used in a specific application may require the additional step of physically drying the biomass prior to processing. This can be expensive, due to energy costs and the need for additional specialized processing equipment, and also a technically difficult process.

Different utilization technology needs for biomass 14 can be optimized for different kinds of biomass and for biomass with different chemical compositions. For example, these utilization technologies can include gasification, fast pyrolysis, papermaking, co-firing combustion, fermentation, etc. Many fermentation systems focus exclusively on utilization of the cellulose fraction. Therefore, segregating biomass collection units 16 (such as bales) of a given type (maize stalks) with high levels of cellulose from those with low levels of cellulose provides numerous benefits. The producer can segregate bales to enable value-added opportunities and sell bales based upon cellulose content. The processor can optimize process design or operation to increase product yield and reduce product cost. Studies have shown that if one was producing ethanol from maize stalks, a dry ton of high cellulose biomass would yield 30% more ethanol than a dry ton of low cellulose biomass and reduce the cost per gallon by a similar amount.

The above factors are functions of the chemical composition of the agricultural field soil 12 and quality characteristics of the harvested biomass 14 which, in turn, are sensed and biomass quality analyzer 70, dirt control system 63, ground cover residue monitor 76, and soil chemical analyzer 90 in conjunction with geographical field positioning as one of the functions of active tracking system 81. The sensed data points are then transmitted by these sensors to central processing unit 28 which, through execution of the stored instruction set, integrates the sensed data points to determine the quality index of the accumulated biomass units 16 and the quantity of biomass to be harvested from or to remain on the agricultural field 12 in real time. Those practiced in the art will recognize that this system can function with multiple-pass harvesting systems as well as single-pass harvesting systems utilizing positional data from active tracking system 81.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A biomass harvesting system for harvesting biomass from agricultural fields, said biomass harvesting system comprising in operative combination:
   a power source for providing mechanical and electric power to said system;
   a biomass accumulator for producing discrete units of accumulated biomass;
   a windrower for feeding biomass to said biomass accumulator;
   a biomass quality analyzer for sensing and transmitting a set of quality characteristics of the accumulated biomass;
   a soil chemical analyzer for sensing in real-time and transmitting soil chemical characteristics of the agricultural field soil;
   a ground cover residue monitor for determination of the quantity of biomass remaining on the agricultural field;
   a central processing unit including a memory module storing an executable instruction set therein, said central processing unit executing said instruction set and integrating said sensed biomass quality characteristics, sensed quantity of biomass remaining on the agricultural field, and said sensed soil chemical characteristics of the agricultural field to determine in real-time and in accordance with said executed instruction set a quantity of biomass to remain on said agricultural field; and
   an active tracking system for associating a specific geographical location of the agricultural field with said biomass quality characteristics and said sensed soil chemical characteristics.

2. The biomass harvesting system according to claim 1 wherein said soil chemical analyzer comprises:
   a soil penetration element;
   a spectrometer communicatively integrated with said central processing unit; and
   at least one sensor head operatively connected to said spectrometer, said at least one sensor head mounted on said soil penetration element for vertical profile scanning of the topsoil layer of the agricultural field to determine a vertical chemical profile of the topsoil layer after biomass chopped by said biomass harvesting system has been removed therefrom.

3. The biomass harvesting system according to claim 2 wherein said soil chemical analyzer comprises a plurality of spectrometers and sensor heads mounted on said soil penetration element in a vertically spaced apart arrangement, each said sensor head being associated with a spectrometer.

4. The biomass harvesting system according to claim 1 wherein said active tracking system includes a global positioning system in operable association with said central processing unit, said active tracking system creating an identification file for individual ones of the discrete units of accumulated biomass, said identification file including geographical location and quality characteristics of the biomass unit.

5. The biomass harvesting system according to claim 1 wherein said active tracking system includes a radio frequency identification system in operable association with said central processing unit, said active tracking system creating an identification file for individual ones of discrete units of accumulated biomass, said identification file including quality characteristics of each discrete biomass unit and further wherein said active tracking system transfers said identification file to a radio frequency identification tag for attachment to each discrete biomass unit upon creation thereof.

6. The biomass harvesting system according to claim 1 wherein said biomass accumulator is a baler and the discrete units of accumulated biomass produced thereby are individual bales of accumulated biomass.

7. The biomass harvesting system according to claim 1 wherein said windrower includes:
   at least one chopping unit for chopping the biomass; and
   a transporter for collecting the chopped biomass and moving the chopped biomass to a windrow for collection by said biomass accumulator.

8. The biomass harvesting system according to claim 7 wherein said transporter includes at least one auger within a slotted housing, said slotted housing being adjustable to regulate a cross-sectional area of individual slots to permit the sifting out of unwanted particulates.

9. The biomass harvesting system according to claim 1 wherein said biomass quality analyzer comprises a spectrometer and an associated sensor head connected thereto, said sensor head positioned to scan the stream of chopped biomass fed to the biomass accumulator from the windrower.

10. The biomass harvesting system according to claim 1 further including a dirt control system to determine excessive dirt level quantities in response to dirt level quantities sensed by said quality analyzer and to cause said central processing unit to adjust operational characteristics of said biomass harvesting system in response thereto to reduce dirt level quantities in the accumulated biomass.

11. The biomass harvesting system according to claim 10 wherein said dirt control system further comprises:

said windrower having at least one chopping unit for chopping the agricultural plant growth and a transporter for collecting the chopped agricultural plant growth, said transporter moving the chopped agricultural plant growth to a windrow for collection by said biomass accumulator, said transporter having adjustable slots therein for the selective sifting out of unwanted particles; and said central processing unit adjusting a height above ground surface of said windrower, and a size of said adjustable slots in said transporter in response to electronic signals received from said biomass quality analyzer representing a quantity of unwanted dirt particles contained in the chopped agricultural plant growth.

* * * * *